July 6, 1937. F. L. SESSIONS 2,086,305
APPARATUS FOR ELECTRIC WELDING
Filed Aug. 7, 1931 2 Sheets-Sheet 1
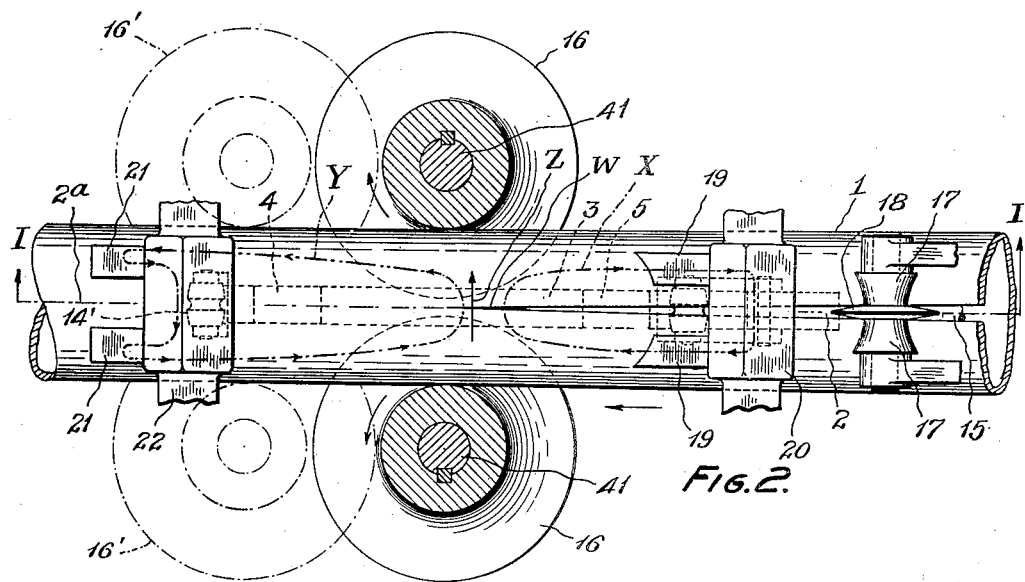
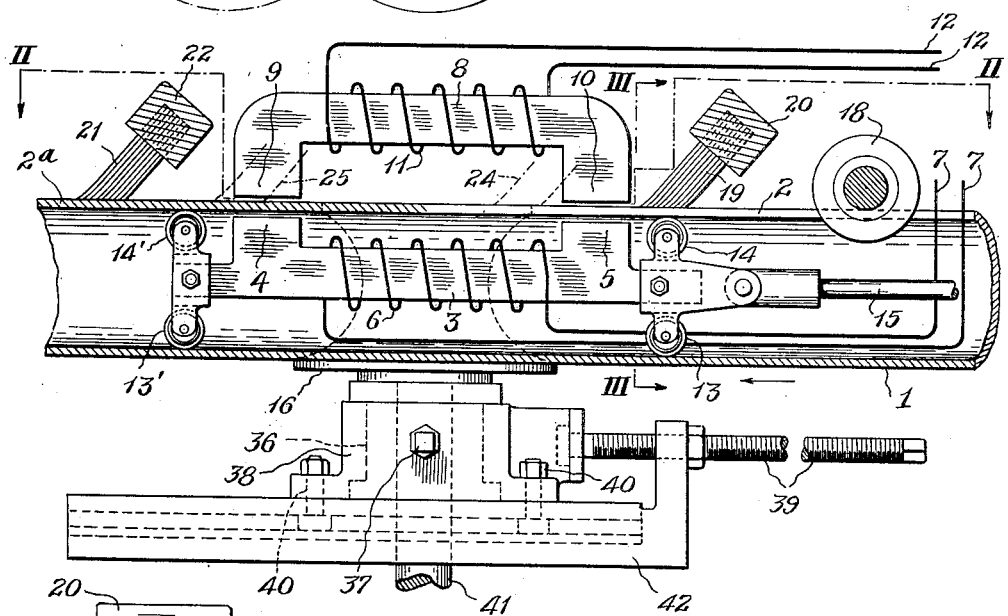
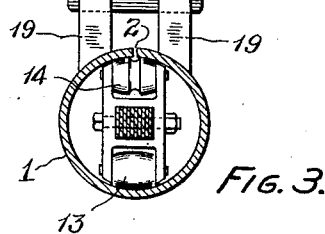
INVENTOR:
Frank L. Sessions July 6, 1937.  F. L. SESSIONS  2,086,305
APPARATUS FOR ELECTRIC WELDING
Filed Aug. 7, 1931  2 Sheets-Sheet 2

INVENTOR:
Frank L. Sessions

Patented July 6, 1937

2,086,305

UNITED STATES PATENT OFFICE 2,086,305

APPARATUS FOR ELECTRIC WELDING

Frank L. Sessions, Lakewood, Ohio

Application August 7, 1931, Serial No. 555,820

24 Claims. (Cl. 219—6)

This invention relates to apparatus for welding by the electric induction method a seam in metallic articles such as tubing, metal cylinders, etc., that are adapted to be traversed longitudinally past the welding device.

Among the objects of my invention are:

The provision of means whereby the induced welding current may be utilized effectively to start the weld close to the leading end of the article to be welded, and to continue the weld close to the trailing end of the article to be welded.

The provision of an electrical conducting means having brush or roller contacts bearing on opposite sides of the seam to complete an auxiliary or supplementary circuit in which induced current will flow to supplement the circumferentially-flowing induced currents in the tube itself thereby reducing the loss in E. M. F. required to cause the welding current to flow through that portion of the circuit where heating is not desired and leaving available a greater proportion of the total induced E. M. F. to overcome the resistance of the seam.

These and other objects which will be apparent from the specification and drawings, are accomplished by the use of my invention.

The drawings show my invention applied to progressive electric induction welding of tubing or pipe.

In the drawings:

Fig. 1 is a diagrammatic side elevation partly in section taken in a plane indicated by line I—I in Fig. 2 and shows a tube being welded.

Fig. 2 is a partial plan view of the apparatus shown in Fig. 1 taken from a plane indicated by the line II—II in Fig. 1.

Fig. 3 is a vertical cross section taken in a plane indicated by the line III—III in Fig. 1.

Figure 4:
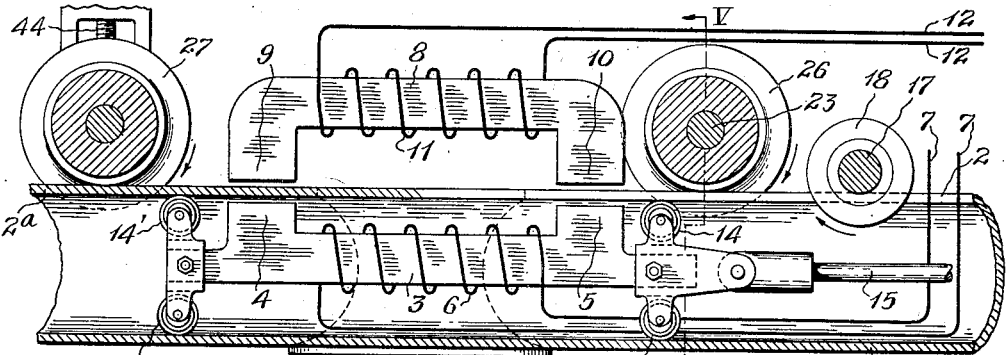
Fig. 4 is a diagrammatic side elevation partly in section taken in a vertical longitudinal plane through the center of the tube. It is similar to Fig. 1 except that it shows the use of rollers instead of brushes contacting with the tube.

In progressive electric induction welding of tubing, pipe, or other similar articles, the metal of the article being welded forms, in itself, a single turn secondary of a transformer which secondary has a continuous progressive movement relative to a magnetic field, such that new portions of the articles are being continuously traversed by this magnetic field to have welding currents induced in them. The induced currents follow various paths through the metal and across the seam to cause the metal at the seam to be heated to the desired welding temperature at the point where external pressure is applied to press the seam edges together to complete the weld. The primary winding of the transformer together with such laminated magnetic cores as may be used, if the frequency of the primary current is such as to require their use, are termed induction units. In the drawings, I have conventionally shown induction units suitable for causing induced currents to flow in the tube and across the seam.

As shown in the drawings, the tube 1, or other article to be welded, is moving from right to left and has an open or unwelded seam 2. The welded seam is indicated at 2a.

The internal induction unit comprises a magnetic core having a longitudinally extending center section 3 with poles 4 and 5 at each end of the center section 3 and an energizing coil 6 connected to a suitable source of alternating current supply by cables or bus bars 7—7. The poles 4 and 5 extend towards and into close proximity with the inside surface of the tube and are positioned so that the seam passes substantially opposite the center of the poles. The supply cables 7—7 are led back through the inside of the tube towards the end at which the tube enters the apparatus and extend out through the open seam at a point where the opposite seam edges are held sufficiently far apart to permit the cables to pass through.

The external induction unit comprises a magnetic core having a center section 8, poles 9 and 10, and an energizing coil 11 connected to a suitable source of alternating current supply by wires or cables 12—12. The poles 9 and 10 extend towards and into close proximity to the outside surface of the tube, opposite the poles 4 and 5 of the internal induction unit.

It is desirable that the induction units be supported so that the air gap between the pole faces be maintained substantially constant during welding in order that the reluctance of the magnetic circuit remain constant to insure uniform welding temperature. Provision may be made in apparatus of this sort for varying the air gap in order thus to control the reluctance of the magnetic circuit and the temperature of the metal being welded, but, to secure uniform welding, the air gap should remain constant at all times unless it is purposely desired to change it, as for instance when the character or condition of the metal constituting the work changes. I have shown the internal induction unit supported upon suitable rollers 13, 13' and 14, 14', and anchored by means of the rod 15 which extends back towards the trailing end of the tube. The rod 15 is preferably secured to a plate (not shown) which extends through the open slot 2, and is anchored to some suitable rigid support such as the frame of the machine. In this manner the internal induction unit is properly supported and positioned so that its poles 4 and 5 maintain the desired relationship to the inside surface of the tube and with respect to the poles 9 and 10 of the external induction unit. The support for the external induction unit is not shown in these drawings, but it is understood that any suitable means for this purpose may be employed, such as, for instance, mechanism of the type shown in my co-pending application Serial No. 377,423.

Figures 5, 7:
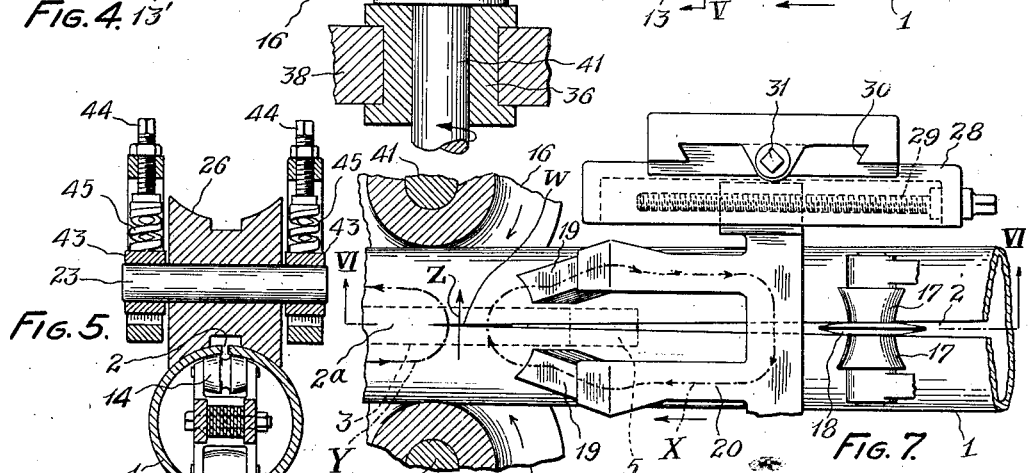
Fig. 5 is a vertical cross section taken in a plane indicated by the line V—V in Fig. 4.
Fig. 7 is a partial plan view of the apparatus shown in Fig. 6.

For the sake of clearness the center section 8 of the external magnetic core and poles 9 and 10 are not shown in Figs. 2 and 7. It will be understood that they are opposite the center section 3 and the poles 4 and 5 of the internal magnetic core. Furthermore, it should be understood that while the drawings show the seam to be welded at the top of the tube as it passes from right to left, it may just as readily be located at the bottom of the tube, as it would be seen if Figs. 1, 4, and 6 were inverted, or at the side of the tube.

It should be understood that both the internal and external induction units may be wound as shown with the energizing coils 6 and 11 respectively, or that either winding 6 or winding 11 may be dispensed with, leaving only one energizing coil to do the work, or that a coil may surround the outside of the tube in known manner and not be immediately around either of the magnetic cores.

The pressure rolls 16—16 are applied to press the opposite seam edges together at the required point for completing the weld. This may be at some point intermediate the poles 5, 10 and 4, 9, or it may be actually slightly beyond the poles 4, 9 in the direction of movement of the tube. This point may best be determined experimentally but it is that point where the edges of the tube normally reach the best condition and temperature at which to complete the weld which is preferably a progressive "flash" weld. To the left of the line joining the centers of the pressure rolls 16—16 the seam is shown in cross section at 2a, as beyond the point where the rolls 16—16 are closest together the seam has been welded. The rolls 16—16 may also be positively driven feed rolls to co-operate with other suitable feed rolls (not shown) for feeding the tube through the machine. The rolls 16—16 are mounted on and keyed to shafts 41 and are supported by suitable thrust plates or bearings and the slide blocks 36 which are mounted for transverse adjustment in the slide-way member 38. A suitable adjusting screw 37 is provided at each side of the machine for moving the rolls 16—16 in and out transversely towards or away from the tube. The member 38 is mounted on a suitable base 42 which is provided with a suitable guideway for permitting the longitudinal adjustment of the member 38 and the rolls 16—16. An adjusting screw 39 is provided for moving and adjusting the member 38 longitudinally of the tube. Bolts 40 are loosened when it is desired to make this adjustment by means of the screw 39 and are tightened to hold the rolls fixed longitudinally in the desired position. This adjustment moves rolls 16—16 longitudinally of the tube to positions such as 16'—16', shown on dotted lines. The transverse adjustment of the rolls 16—16 by means of the screws 37 is used to bring the seam edges together with the proper welding pressure and to provide the required upset or take-up in the weld.

A seam spreading device may be provided and is best made of two roll members 17 and a disc-like member 18 adapted to enter the unwelded seam 2. This seam spreading device serves to properly guide and position the seam as it approaches the induction units and also spreads the seam edges to hold them apart until they reach the welding zone W where it is desired to have the welding current flow across the seam. The welding zone W may be made longer or shorter as found desirable by using a thicker or thinner disc member 18 in the spreading device, or by moving the pressure rolls 16—16 forward in the direction of movement of the tube or back towards the seam spreading device.

As shown in Figs. 1, 2, and 3, I provide at the work entering end of the induction units, electrical contact brushes 19—19 supported in a suitable conductor block 20. The brushes 19—19 bear upon the surface of the tube 1 upon opposite sides of the seam, and, together with the block 20, form electrical conducting means which bridges the gap across the open seam 2. This electrical conducting means together with a portion of the metal of the tube adjacent the seam forms a closed electrical circuit or loop represented by the dotted line X electrically in parallel with the circumferential circuit through the metal of the tube. This loop surrounds and is linked with the lines of force of the magnetic field in that portion of the magnetic circuit which passes through the poles 10 and 5. A similar set of brushes 21—21 and supporting block 22 may be disposed at the work exit end of the induction units (the left hand end as shown in the drawings). This forms a similar loop, represented by the dotted line Y, which is linked with the lines of force of the magnetic field in that portion of the magnetic circuit which passes through the poles 9 and 4. If preferred, the electrical conducting means contacting with the surface of the tube 1 upon the opposite sides of the seam may take the form of conductor contact rolls 26 and 27, as shown in Figs. 4 and 5 of the drawings, instead of the brushes 19—19 and 21—21 and their supporting blocks 20 and 22. The brushes 19—19 and 21—21 or the contact rolls 26 and 27 preferably should be grooved to fit the contour of the tube surface and be pressed with firm pressure upon the tube to make good electrical contact in order to carry their quota of the large welding current which flows across the seam. Preferably the surface of the tube should be clean in order that these bridging contact members may make good and uniform contact with the tube. For cleaning the surface of the tube, either pickling or sand blasting or other suitable means may be employed.

Fig. 5 shows a suitable mounting for the contact rolls 26 and 27. Such contact rolls are preferably made of copper or other good electrical conducting material and are provided with a groove in the center to bridge the seam. The roll 26 is shown mounted on a shaft 23 to rotate in bearing blocks 43—43 which are adjustable towards and away from the tube by means of adjusting screws 44—44. Springs 45—45 may be used to provide resilient contact pressure between the contact roll 26 and the surface of the tube. The supporting roll 14 of the internal induction unit may also be provided with a groove to bridge the seam edges. This supporting roll 14 also completes an electrical circuit or loop through the metal of the tube adjacent the seam by thus bridging the open seam. This latter loop is substantially in parallel with the loop formed by the electrical conducting means made up of brushes 19—19 and the conductor block 20, or by the contact roll 26, if such roll be used.

Figure 6:
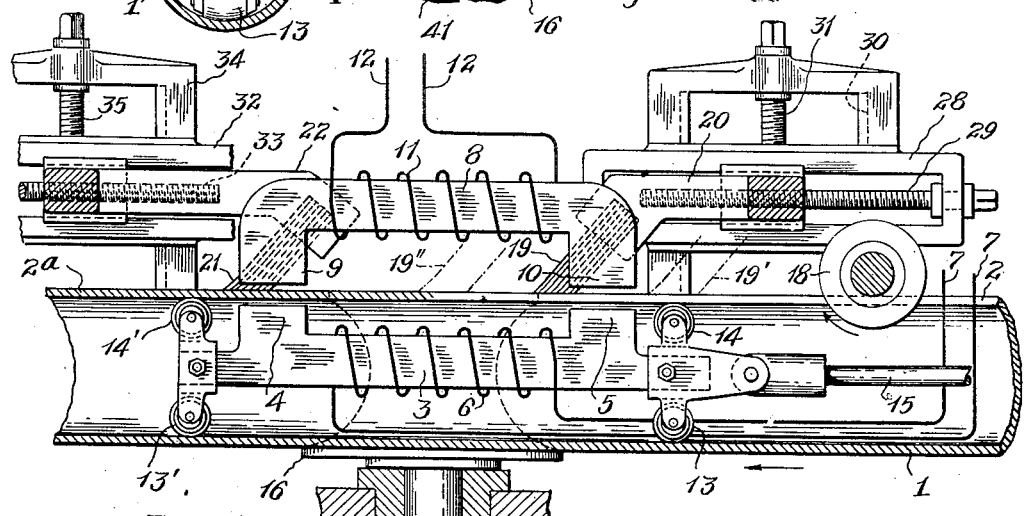
Fig. 6 is a diagrammatic side elevation partly in section taken in a plane indicated by the line VI—VI in Fig. 7 and shows a modified embodiment of parts shown in Fig. 1.

In Figs. 6 and 7 I have shown adjustable means for supporting and positioning the contact brushes 19 and 21. The conductor blocks 20 and 22 take the form of U-shaped members. The U-shaped conductor block 20 is adapted to slide longitudinally in the slideways of member 28, and is adjusted to the desired position by means of the adjusting screw 29. The member 28 is provided with a transverse slide which is adapted to be moved in the slideway of the supporting member 30 by means of the adjusting screw 31. This latter adjustment is provided to maintain the proper pressure between the contact brushes 19—19 and the surface of the tube. It will be understood that it is preferable to provide these supporting and positioning slides on each side of the conductor block 20, although only one is shown in Fig. 7. In similar manner when the contact brushes 21—21 are used, conductor block 22 may be provided with corresponding slides, slideway member 32, longitudinal adjusting screw 33, supporting member 34, and transverse adjusting screw 35. As shown in Fig. 6, the contact brushes 19 may be located anywhere between the dotted line positions 19' and 19", and the brushes 21 may be correspondingly adjusted longitudinally to the most efficient operating position.

In the operation, the tube is fed from right to left through the induction units by any suitable means such as rolls 16 and/or feed rolls similar to the rolls 16, or other means. As the tube passes the seam spreading device the seam is held open a predetermined amount, this amount depending upon the diameter of the tube, its thickness of wall and the distance required to again bring the edges together without buckling them or throwing them out of register. It will be understood that for successful seam welding, the edges of the tube should meet accurately in alignment so that the internal and external cylindrical surfaces of the welded tube shall be continuous and have no off-sets or shoulders at the weld. As the end of the tube passes along into the welding zone W the pressure rolls 16—16 cause the opposite edges of the seam to contact first gradually and lightly and then with greater pressure as the tube passes to the line joining the centers of the rolls 16. Up to the time the opposite edges of the seam contact with each other in the welding zone no current has passed across the seam, but as soon as the edges contact with each other the electromotive forces which are induced in the various secondary circuits, due to their being cut by or linked with the alternating magnetic field of the induction units, cause current to flow across the seam in the welding zone represented by a heavy line W in Figs. 2 and 7. One path for the currents that flow across the seam will be circumferentially around the tube. Another path will be across the seam in the heating zone W, then through the metal of the tube, then through the electrical conducting means formed by the brushes 19 and the block 20, then through the metal of the tube back to the heating zone. This path is represented by the dotted line X in Figs. 2 and 7 and completes an electrical circuit or loop disposed generally on one side of and not surrounding the tube but so as to be linked with the magnetic field of the induction units. This circuit is in reality a single turn secondary circuit of a transformer, in parallel with the circumferential secondary circuit.

Heretofore it has been difficult to make the weld "take hold" at the leading end of the tube for the reason, in part at least, that the resistance of the tube circumferentially is so great that insufficient current will flow unless the tube extends substantially the full length of the induction units, or until a considerable length of the opposite edges of the seam have come into contact. By providing a low resistance bridging member across the seam outside of the magnetic field that flows between poles 5 and 10, a low resistance path for the welding current is provided and the weld will commence sooner than it does when this provision is not made.

The brushes 19 may be extended forward as shown in Fig. 6 or additional brushes shown in dotted line at 24 in Fig. 1 may be employed and they may be connected by suitable conductors with the block 20. This will maintain the low resistance supplementary secondary circuit through the brushes and supporting block 20 until the trailing end of the tube has nearly reached the welding zone.

The brushes 21, which may also be adjusted towards the welding zone as shown in Fig. 6 or augmented by other brushes such as are shown in dotted outline at 25 in Fig. 1, reduce the resistance of the electrical circuit around the magnetic circuit by bridging the high resistance red hot metal in the welded seam 2a, and also by bridging any short unwelded portion of the seam at the leading end of the tube after it has passed the welding zone. The path of the current through these brushes 21—21, the block 22 and the tube is represented by the dotted line Y. The circumferential path of the current through the welding zone is represented by the arrow Z.

I do not limit myself to the specific apparatus shown in the drawings and described in this specification, as it will be evident to those skilled in the art that modifications may be made without departing from the scope of my invention.

Cross reference is hereby made to my United States patent application Serial No. 731,791, filed June 21, 1934, in which I have described and claimed certain features of construction and methods of operation which are disclosed but not claimed herein.

I claim:

1. In apparatus for the electrical induction welding of a seam in metal, an electric coil, means for transmitting an alternating current therethrough to develop a magnetic field, means for traversing metal having an open seam through said magnetic field, and electrical conducting means in contact with said metal upon opposite sides of said seam, said electrical conducting means completing a loop disposed at one side of and not surrounding said metal, the balance of said loop being through said metal and across said seam, said loop being linked with a portion of said magnetic field, and means for pressing the edges of said seam together.

2. Apparatus for the electrical induction welding of a seam in a metal tube comprising means for developing a field of alternating magnetic force, means for feeding said tube through said field of force, electrical conducting means in contact with said tube upon opposite sides of said seam and adjacent thereto, said electrical conducting means comprising contact brushes located upon opposite sides of said seam and a conductor block connecting said contact brushes, said electrical conducting means completing an electric circuit not encircling said tube, said electric circuit being linked with a portion of the magnetic circuit of said field of alternating magnetic force, and means for exerting welding pressure on said seam.

3. In apparatus for the electrical induction welding of a seam in metal, means for developing an alternating magnetic field, means for traversing a metal article through said field to induce welding current to flow in said metal across said seam, an electrical circuit for said welding current composed of a portion of said metal article adjacent to and on each side of said seam and current conducting means in contact with said metal on each side of said seam, said electrical circuit being disposed on one side of and not surrounding said metal article and linked with a portion of said magnetic field, and means for exerting welding pressure on said seam.

4. Apparatus for the electrical induction welding of a seam in metal tubing comprising a magnetic core supported outside of the tube, said core having a longitudinally-extending center section and a pole at each end in close proximity to said tubing at said seam, another longitudinally-extending magnetic core supported inside of said tube and having poles in close proximity to said tubing opposite said first named poles, means for developing an alternating magnetic field in said cores to induce welding current to flow in said tubing across said seam, an electric circuit for said current comprising the circumferential portion of the metal of said tube in the region of said magnetic field, another electric circuit for said current comprising a portion of the metal of said tube adjacent said seam and electrical conducting means contacting with the surface of said tube adjacent to said seam, said last named electric circuit forming a loop disposed entirely on one side of and not encircling said tube, said loop being linked with a portion of said magnetic field, means for causing relative traversing movement of said tube and said magnetic field, and means for exerting welding pressure on said seam.

5. Apparatus for the electrical induction welding of a seam in metal tubing comprising a magnetic core supported outside of the tube, said core having a longitudinally-extending center section and a pole at each end in close proximity to said tubing at said seam, another longitudinally-extending magnetic core supported inside of said tube and having poles in close proximity to said tubing opposite said first named poles, means for developing an alternating magnetic field in said cores to induce welding current to flow in said tubing across said seam, an electric circuit for said current comprising the circumferential portion of the metal of said tube in the region of said magnetic field, other electric circuits for said current comprising portions of the metal of said tube adjacent said seam and electrical conducting means contacting with the surface of said tube adjacent said seam, said last named electrical circuits forming loops disposed entirely on one side of and not encircling said tube, said loops being linked with portions of said magnetic field at the ends of said magnetic cores, means for causing relative traversing movement of said tube and said magnetic field, and means for exerting welding pressure on said seam.

6. In apparatus for the electrical welding of a seam in tubing by the induction method in which electric current is caused to flow in the metal of the tube and across the seam to be welded by causing the tube to progressively traverse an alternating magnetic field, means for developing an alternating magnetic field and a supplementary electric circuit in which current is induced to flow, said supplementary circuit comprising a portion of the metal of the tube on each side of said seam and electrical conducting means contacting with the surface of said tube on each side of said seam, said supplementary circuit forming a loop disposed entirely on one side of and not surrounding said tube, said loop being linked with a portion of said magnetic field.

7. The subject matter of claim 6, said electrical conducting means comprising a current-conducting contact portion adapted to contact with the surface of said tube adjacent to and on one side of said seam, another current-conducting contact portion adapted to contact with the surface of said tube adjacent to and on the opposite side of said seam, and an electrical connection between said contact portions.

8. In apparatus for the electrical induction welding of the surfaces of a seam in metal, an electric coil, means for transmitting alternating current therethrough to develop a magnetic field, means for traversing metal having an initially open seam through said magnetic field to cause electric current to tend to flow across said seam, electrical-conductor, contact-roll means in contact with said metal upon opposite sides of said seam and disposed to electrically bridge said seam at one side of said magnetic field, and means for pressing said surfaces together at the other side of said magnetic field.

9. In apparatus for electrically welding a seam in tubing, means for developing a field of alternating magnetic force, means for feeding a tube through said field of force, electrical conducting means contacting with said tube upon opposite sides of said seam, said electrical conducting means being located entirely at one side of and not encircling said tube and disposed to complete a loop linked with a portion of said field of force, the balance of said loop being through the metal of said tube and across said seam, and means for applying pressure to close said seam.

10. Apparatus for the electrical induction welding of a seam in tubing comprising an external magnetic body disposed on the outside of the tube and having a magnetic pole in close proximity to said tube, an internal magnetic body disposed on the inside of said tube and having a magnetic pole in close proximity to said tube, said latter pole being situated opposite said first named pole, means comprising an electric induction coil for setting up rapidly alternating lines of magnetic force in said magnetic bodies, means for supporting said tube, means for causing relative traversing movement of said tube and said magnetic bodies, electrical conducting means adapted to contact with the surface of said tube on each side of said seam, said electrical conducting means completing a loop disposed at one side of said tube and not encircling the outside of said tube, the balance of said loop being through the metal of said tube and across said seam, said loop being linked with a portion of said lines of magnetic force, means for adjusting said electrical conducting means towards and away from the axis of said tube, and means for exerting welding pressure on said seam.

11. Apparatus for the electrical induction welding of a seam in tubing comprising an external magnetic body disposed on the outside of the tube and having a magnetic pole in close proximity to said tube, an internal magnetic body disposed on the inside of said tube and having a magnetic pole in close proximity to said tube, said latter pole being situated opposite said first named pole, means comprising an electric induction coil for setting up rapidly alternating lines of magnetic force in said magnetic bodies, means for supporting said tube, means for causing relative traversing movement of said tube and said magnetic bodies, contact members adapted to contact with the surface of said tube adjacent to and on each side of said seam, an electrical conductor joining said contact members, said electrical conductor being disposed at one side of and not encircling said tube and disposed to complete an electrical circuit, the balance of said electrical circuit being through the metal of said tube and across said seam, said electrical circuit being linked with a portion of said lines of magnetic force, means for adjusting said contact members towards and away from the axis of said tube, and means for pressing together the edges of said seam.

12. The subject matter of claim 6 in combination with means for adjusting said electrical conducting means longitudinally of said seam.

13. In apparatus for electrically welding together the contacting surfaces of an open seam in a metal tube, means for developing an alternating magnetic field, means for feeding said tube through said magnetic field to cause electric current to flow in said tube across said seam, electrical conducting means in contact with said tube upon opposite sides of said seam and disposed to bridge said open seam at the side of said magnetic field where said tube approaches it and to complete a loop linked with a portion of said magnetic field, and means for applying welding pressure to said tube to press together the surfaces to be welded.

14. In apparatus for electrically welding together the contacting surfaces of an open seam in a metal tube, means for developing an alternating magnetic field, means for feeding said tube through said magnetic field to cause electric current to flow in said tube across said seam, electrical conducting means in contact with said tube upon opposite sides of said seam closely adjacent to said seam but not in contact with said tube at other points, said electrical conducting means completing a loop surrounding a portion of said magnetic field, the balance of said loop being through the metal of said tube and across said seam.

15. In apparatus for the electrical induction welding of a seam in metal, an electric coil, means for transmitting an alternating current therethrough to develop a magnetic field, means for traversing metal having a seam to be welded through said magnetic field, electrical conducting means in contact with said metal upon opposite sides of said seam, said electrical conducting means completing a loop disposed at one side of and not surrounding said metal, the balance of said loop being through said metal and across said seam, said loop being linked with a portion of said magnetic field, means for adjusting said electrical conducting means longitudinally of said seam in said metal, and means for pressing the edges of said seam together.

16. In apparatus for the electrical induction welding of a seam in metal, means for developing an alternating magnetic field, means for traversing a metal article through said field to induce welding current to flow in said metal across said seam, an electrical circuit for said welding current composed of a portion of said metal article adjacent to and on each side of said seam and current conducting means in contact with said metal on each side of said seam, said electrical circuit being disposed on one side of and not surrounding said metal article and linked with a portion of said magnetic field, means for adjusting said current conducting means longitudinally of said seam in said metal, and means for exerting welding pressure on said seam.

17. In apparatus for the electrical welding of a seam in metal tubing, an external magnetic member having a plurality of spaced apart magnetic poles, a magnetic core adjacent to but spaced from said poles, said core being adapted to pass longitudinally through the tube being welded, means for developing an alternating magnetic field of force in said magnetic member and said magnetic core, means for feeding a tube having an initially open seam longitudinally over said core through said magnetic field, means adapted to close said initially open seam at a point intermediate the ends of said magnetic member, electrical conducting means in contact with said tube upon opposite sides of said seam, said electrical conducting means being disposed to complete a loop around said magnetic member, the balance of said loop being through said metal and across said seam between said poles.

18. In apparatus for progressively, electrically welding a longitudinal seam in tubing, means for inducing an alternating electromotive force in the tube tending to cause electric current to flow in said tube and across the seam, means for causing relative traversing movement of said tube and said inducing means, current conducting contact members contacting with the surface of said tube on opposite sides of said seam in advance of the point where the edges of said seam first contact, said contact members being energized to apply a potential difference to said tube at their points of contact therewith, and means for causing the edges of said seam to contact with each other at a point beyond the contact areas of said contact members with said tube in the direction of movement of said tube.

19. In apparatus for the progressive electric welding of a longitudinal seam in tubing, means for passing the tube to be welded through a magnetic field in a direction substantially parallel to the longitudinal axis of said tube, said magnetic field being adapted to link said tube to induce an alternating electromotive force in said tube tending to cause alternating current to flow in said tube and across said seam, means for holding the edges of the seam in definite spaced relation near the end of said magnetic field which said tube approaches, current conducting contact members contacting with the surface of said tube on opposite sides of said seam in advance of the point where the edges of said seam first come together, said contact members being energized to apply a potential difference to said tube at their points of contact therewith, and means for causing the edges of said seam to contact with each other at a point beyond the contact areas of said contact members with said tube in the direction of movement of said tube.

20. In apparatus for the progressive electric welding of a longitudinal seam in tubing, means for passing the tube to be welded through a magnetic field in a direction substantially parallel to the longitudinal axis of said tube, said magnetic field being adapted to link said tube to induce alternating electromotive force in said tube tending to cause alternating current to flow in said tube and across said seam, means for holding the edges of the seam in definite spaced relation at a point near the end of said magnetic field which said tube approaches, current conducting, contact members adapted to engage the surface of said tube on opposite sides of said seam at a point in advance of the point where said edges of the seam are moved together, said contact members being energized to apply a potential difference to said tube at their points of contact therewith, and external roll means engaging the outside surface of said tube for causing the edges of said seam to contact with each other at a point beyond the contact areas of said contact members with said tube in the direction of movement of said tube.

21. In apparatus for the progressive, electric welding of a longitudinal seam in metal tubing, means for moving the tubing through a welding zone, energized, current-conducting contact members adapted to apply a potential difference across the seam cleft and having areas of contact with the surface of the tubing on each side of the seam cleft, said contact areas being limited in their circumferential extent to arcs of not exceeding ninety degrees on each side of said seam, means for maintaining the edges of said seam in spaced relation between said contact areas of the contact members with the tubing, means for closing the seam at a point removed from said contact areas in the direction of movement of the tubing, induction coil means adapted to induce an electromotive force in the body of said tubing tending to cause electric current to flow around the back half of said tubing in a direction opposed to the current which tends to flow around the back half of said tubing from said contact members, and means for varying the longitudinal distance between said contact areas of the contact members and the point of seam closure.

22. In apparatus for the progressive, electric resistance welding of a longitudinal seam in metal tubing, a plurality of laminated brushes contacting with the surface of the tube on one side of the seam to be welded, said brushes being of the same polarity when energized and being spaced apart longitudinally along the tube, another plurality of laminated brushes contacting with the surface of the tube on the opposite side of the seam to be welded, said other plurality of brushes being spaced apart longitudinally along the tube and of opposite polarity when energized from said first named brushes, and means for energizing said last-named brushes continuously during welding to apply a potential difference across the seam cleft, said laminated means comprising a laminated iron core inside of said tube opposite said brushes, a laminated iron core outside of said tube opposite said inside core, and induction coil means adapted when energized to develop a magnetic field of force in said cores.

23. In apparatus for the progressive, electric resistance welding of a seam in metal tubing, an induction coil inside of the path of movement of the tube to be welded, means for supporting said induction coil, and current conducting electrodes adapted to contact with said tube on opposite sides of the seam to be welded, said electrodes being adapted to apply a potential difference across the seam cleft, said induction coil means being adapted to induce a circumferential electromotive force in the wall of said tube throughout a zone extending longitudinally of the tube in each direction from the region of contact of said electrodes with said tube, the direction of said electromotive force being, at each instant, the same along the entire extent of said zone, said electromotive force and said potential difference being so correlated that together they cause a cross-seam current to flow in sufficient volume to heat the seam edges to the desired temperature.

24. In apparatus for the progressive, electric welding of a longitudinal seam in metal tubing, means for moving the tubing through a welding zone, energized, current-conducting contact members adapted to apply a potential difference across the seam cleft and having areas of contact with the surface of the tubing on each side of the seam cleft, said contact areas being limited in their circumferential extent to arcs of not exceeding ninety degrees on each side of said seam, means for maintaining the edges of said seam in spaced relation between said contact areas of the contact members with the tubing, means for closing the seam at a point removed from said contact areas in the direction of movement of the tubing, and induction coil means adapted to induce an electromotive force in the body of said tubing tending to cause electric current to flow around the back half of said tubing in a direction opposed to the current which tends to flow around the back half of said tubing from said contact members.

FRANK L. SESSIONS.